(12) United States Patent
Sajima et al.

(10) Patent No.: US 11,285,363 B2
(45) Date of Patent: Mar. 29, 2022

(54) GOLF BALL

(71) Applicant: SUMITOMO RUBBER INDUSTRIES, LTD., Kobe (JP)

(72) Inventors: Takahiro Sajima, Kobe (JP); Hironori Takihara, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/848,128

(22) Filed: Apr. 14, 2020

(65) Prior Publication Data

US 2020/0238138 A1 Jul. 30, 2020

Related U.S. Application Data

(62) Division of application No. 16/170,712, filed on Oct. 25, 2018, now abandoned.

(30) Foreign Application Priority Data

Nov. 24, 2017 (JP) .............................. JP2017-225523

(51) Int. Cl.
*A63B 57/00* (2015.01)
*A63B 37/00* (2006.01)
(Continued)

(52) U.S. Cl.
CPC ...... *A63B 37/0087* (2013.01); *A63B 37/0017* (2013.01); *A63B 37/0018* (2013.01); *A63B 37/0021* (2013.01); *A63B 37/0031* (2013.01); *A63B 37/0065* (2013.01); *A63B 37/0074* (2013.01); *A63B 45/00* (2013.01); *B29C 45/14065* (2013.01); *B32B 1/00* (2013.01); *B32B 25/08* (2013.01); *B32B 25/14* (2013.01); *A63B 37/008* (2013.01); *A63B 37/0022* (2013.01); *A63B 37/0095* (2013.01); *A63B 2102/32* (2015.10); *B29C 45/14073* (2013.01);
(Continued)

(58) Field of Classification Search
CPC ........................... A63B 45/00; A63B 37/0004
USPC ........................................................ 473/409
See application file for complete search history.

(56) References Cited

U.S. PATENT DOCUMENTS 6,179,728 B1 * 1/2001 Kashiwagi ......... A63B 37/0003
473/356
2004/0106472 A1 6/2004 Hayashi et al.
(Continued)

FOREIGN PATENT DOCUMENTS

JP 2017-108862 A 6/2017

*Primary Examiner* — Raeann Gorden
(74) *Attorney, Agent, or Firm* — Birch, Stewart, Kolasch & Birch, LLP

(57) ABSTRACT

A golf ball 2 includes a core 4 and a cover 6 positioned outside the core 4. The cover 6 is formed in a mold having support pins by injection molding. A ratio (V/S) of a volume V ($mm^3$) of the cover 6 to an amount of compressive deformation S (mm) of the core 4 is not less than 1000 and not greater than 1900. The cover 6 has a shore D hardness of not greater than 62. The golf ball 2 has a plurality of dimples 8 on a surface thereof. A total volume W of these dimples is not less than 490 $mm^3$ and not greater than 620 $mm^3$. A ratio ($\alpha$/P) of a latitude $\alpha$ (degree) of each support pin to a total cross-sectional area P ($mm^2$) of the support pins is not less than 0.35 and not greater than 0.60.

5 Claims, 11 Drawing Sheets

(51) Int. Cl.
*B29C 45/14* (2006.01)
*B32B 1/00* (2006.01)
*B32B 25/08* (2006.01)
*B32B 25/14* (2006.01)
*A63B 45/00* (2006.01)
*A63B 102/32* (2015.01)
*B29L 31/54* (2006.01)
*B29K 609/00* (2006.01)
*B29K 101/12* (2006.01)

(52) U.S. Cl.
CPC ............... *B29C 2045/14122* (2013.01); *B29K 2101/12* (2013.01); *B29K 2609/00* (2013.01); *B29K 2995/007* (2013.01); *B29L 2031/546* (2013.01); *B32B 2307/536* (2013.01)

(56) References Cited

U.S. PATENT DOCUMENTS

2014/0367884 A1* 12/2014 Iizuka ............... B29C 45/14073
  264/278
2015/0375053 A1* 12/2015 Mimura ............. A63B 37/0074
  473/377
2017/0173400 A1   6/2017 Sajima et al.

* cited by examiner

GOLF BALL

CROSS-REFERENCE TO RELATED APPLICATIONS

This application is a Divisional of U.S. application Ser. No. 16/170,712, filed on Oct. 25, 2018, which claims priority under 35 U.S.C. § 119(a) to Patent Application No. 2017-225523 filed in JAPAN on Nov. 24, 2017. All of the above applications are hereby incorporated by reference into the present application.

BACKGROUND OF THE INVENTION

Field of the Invention

The present invention relates to golf balls. Specifically, the present invention relates to golf balls having a core and a cover.

Description of the Related Art

In an accurate shot, a golf ball is hit at the sweet spot of a clubface. The shock generated upon this shot is small. Upon a mishit, a golf ball is hit at a location other than the sweet spot of a clubface. The shock upon a mishit is great. The great shock gives pain to the hands of the golf player. At this time, the player feels discomfort. In particular, upon a mishit made when the air temperature is low (for example, in winter), the player feels acute pain.

Generally, golf players desire golf balls having favorable feel at impact. In particular, beginners prefer golf balls having soft feel at impact. This is because the frequency of mishits is high in play by beginners.

So-called thread-wound balls used to be mainstream golf balls. At present, thread-wound balls are almost not commercially available. In golf in recent years, so-called solid golf balls such as two-piece balls, three-piece balls, four-piece balls, five-piece balls, six-piece balls, and the like are used.

A solid golf ball has a solid core and a cover. This golf ball can be produced at low cost. A proposal concerning a two-piece ball, which is one type of solid golf ball, is disclosed in JP2017-108862.

Upon shots by beginners, golf balls often fly in an unintended direction. Golf balls often fall into a pond or fly into woods. Beginners often loose golf balls. Therefore, beginners do not prefer expensive golf balls. Solid golf balls are suitable for beginners, since solid golf balls can be produced at low cost. As described above, beginners prefer soft feel at impact. Improvement of feel at impact of solid golf balls is desired.

With a golf ball in which a core having a large amount of deformation when being hit is used, soft feel at impact can be achieved. However, in this golf ball, a cover cannot follow deformation of the core. Large deformation of the core causes breakage of the cover. The golf ball in which this core is used has poor durability.

With a solid golf ball in which a cover having a small volume is used, soft feel at impact can be achieved. However, in this golf ball, a cover does not sufficiently protect the core. When the golf ball is repeatedly hit, the core is broken. The golf ball has poor durability.

The cover of a solid golf ball is generally formed by injection molding. In injection molding for a cover having a small volume, the space between the cavity face of a mold and a core is narrow. This injection molding is difficult to carry out. Through the injection molding, a deviation between the central point of the core and the central point of the golf ball is likely to occur. This deviation is referred to as "eccentricity".

An object of the present invention is to provide a golf ball that has excellent durability and feel at impact and in which eccentricity is suppressed.

SUMMARY OF THE INVENTION

A golf ball according to the present invention includes a core and a cover. The cover is formed in a mold having support pins by injection molding. A ratio (V/S) of a volume V ($mm^3$) of the cover to an amount of compressive deformation S (mm) of the core is not less than 1000 and not greater than 1900. The cover has a shore D hardness of not greater than 62. The golf ball has a plurality of dimples on a surface thereof. A total volume W of the dimples is not less than 490 $mm^3$ and not greater than 620 $mm^3$. A ratio ($\alpha$/P) of a latitude $\alpha$ (degree) of each support pin to a total cross-sectional area P ($mm^2$) of the support pins is not less than 0.35 and not greater than 0.60.

Since the ratio (V/S) is appropriate, the golf ball has excellent durability and feel at impact. Since the ratio ($\alpha$/P) is appropriate, eccentricity can be suppressed in the golf ball and the golf ball can be easily produced.

The amount of compressive deformation S is preferably not less than 3.5 mm.

A number of the support pins is preferably not less than 8 and not greater than 12.

A number of the dimples is preferably not less than 300 and not greater than 400.

The golf ball preferably has a two-piece structure.

According to another aspect, a method for producing a golf ball according to the present invention includes the steps of:

placing a core into a mold having a plurality of support pins and having a cavity face including a plurality of pimples;

holding the core in a cavity of the mold by the support pins;

injecting a melted resin composition into a space between the cavity face and the core; and solidifying the resin composition to form a cover and form a plurality of dimples having a shape that is an inverted shape of the pimples.

In the golf ball obtained by this method, a ratio (V/S) of a volume V ($mm^3$) of the cover to an amount of compressive deformation S (mm) of the core is not less than 1000 and not greater than 1900. The cover has a shore D hardness of not greater than 62. A total volume W of the dimples is not less than 490 $mm^3$ and not greater than 620 $mm^3$. A ratio ($\alpha$/P) of a latitude $\alpha$ (degree) of each support pin to a total cross-sectional area P ($mm^2$) of the support pins is not less than 0.35 and not greater than 0.60.

DESCRIPTION OF THE PREFERRED EMBODIMENTS

The following will describe in detail the present invention based on preferred embodiments with appropriate reference to the drawings.

Figure 1:
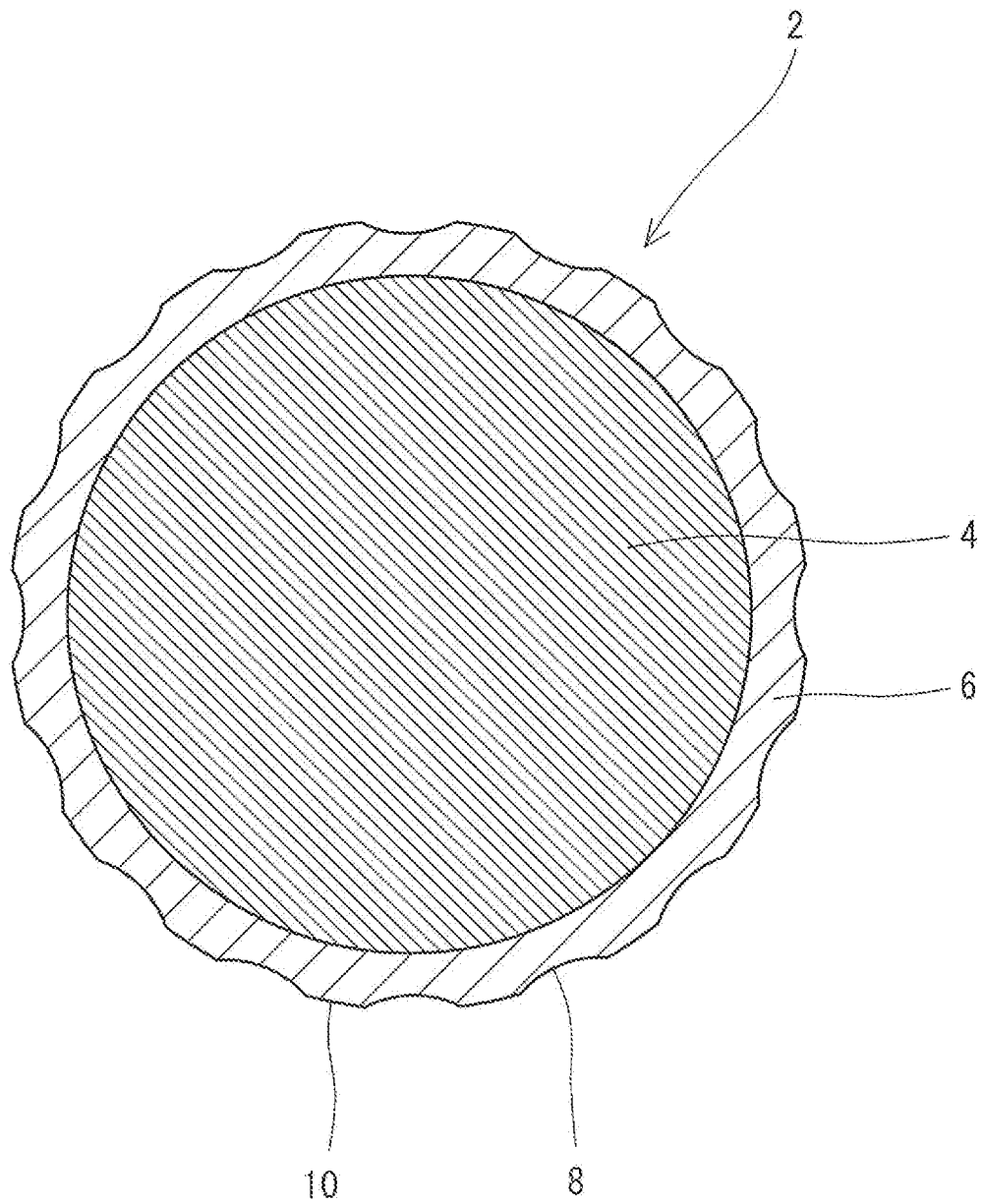
FIG. 1 is a cross-sectional view of a golf ball according to an embodiment of the present invention.

A golf ball 2 shown in FIG. 1 includes a spherical core 4 and a cover 6 positioned outside the core 4. In this embodiment, the cover 6 is directly joined to the core 4. The golf ball 2 is a so-called two-piece ball. The golf ball 2 has a plurality of dimples 8 on the surface thereof. Of the surface of the golf ball 2, a part other than the dimples 8 is a land 10. The golf ball 2 includes a paint layer and a mark layer on the external side of the cover 6 although these layers are not shown in the drawing.

The core 4 may include two or more layers. In this case, each layer may be formed from a rubber composition or may be formed from a resin composition. The cover 6 is the outermost layer excluding the paint layer and the mark layer.

The golf ball 2 preferably has a diameter of not less than 40 mm and not greater than 45 mm. From the viewpoint of conformity to the rules established by the United States Golf Association (USGA), the diameter is particularly preferably not less than 42.67 mm. In light of suppression of air resistance, the diameter is more preferably not greater than 44 mm and particularly preferably not greater than 42.80 mm.

The golf ball 2 preferably has a weight of not less than 40 g and not greater than 50 g. In light of attainment of great inertia, the weight is more preferably not less than 44 g and particularly preferably not less than 45.00 g. From the viewpoint of conformity to the rules established by the USGA, the weight is particularly preferably not greater than 45.93 g.

The core 4 is formed by crosslinking a rubber composition. Examples of preferable base rubbers for use in the rubber composition include polybutadienes, polyisoprenes, styrene-butadiene copolymers, ethylene-propylene-diene copolymers, and natural rubbers. In light of resilience performance, polybutadienes are preferable. When a polybutadiene and another rubber are used in combination, it is preferred if the polybutadiene is a principal component. Specifically, the proportion of the polybutadiene to the entire base rubber is preferably not less than 50% by weight and particularly preferably not less than 80% by weight. A polybutadiene in which the proportion of cis-1,4 bonds is not less than 80% is particularly preferable.

The rubber composition of the core 4 preferably includes a co-crosslinking agent. Preferable co-crosslinking agents in light of durability and resilience performance of the golf ball 2 are monovalent or bivalent metal salts of an α,β-unsaturated carboxylic acid having 2 to 8 carbon atoms. Examples of preferable co-crosslinking agents include zinc acrylate, magnesium acrylate, zinc methacrylate, and magnesium methacrylate. In light of durability and resilience performance of the golf ball 2, zinc acrylate and zinc methacrylate are particularly preferable.

The rubber composition may include a metal oxide and an α,β-unsaturated carboxylic acid having 2 to 8 carbon atoms. They both react with each other in the rubber composition to obtain a salt. The salt serves as a co-crosslinking agent. Examples of preferable α,β-unsaturated carboxylic acids include acrylic acid and methacrylic acid. Examples of preferable metal oxides include zinc oxide and magnesium oxide.

The amount of the co-crosslinking agent per 100 parts by weight of the base rubber is preferably not less than 10 parts by weight. The amount of deformation of the core 4 in which this amount is not less than 10 parts by weight is not excessively large when the golf ball 2 is hit. In the golf ball 2 having the core 4, the cover 6 is less likely to break. The golf ball 2 having the core 4 also has excellent resilience performance. From these viewpoints, this amount is more preferably not less than 15 parts by weight and particularly preferably not less than 20 parts by weight.

The amount of the co-crosslinking agent per 100 parts by weight of the base rubber is preferably not greater than 40 parts by weight. The core 4 in which this amount is not greater than 40 parts by weight sufficiently deforms when the golf ball 2 is hit. The core 4 can achieve soft feel at impact for the golf ball 2. From this viewpoint, this amount is more preferably not greater than 35 parts by weight and particularly preferably not greater than 30 parts by weight.

Preferably, the rubber composition of the core 4 includes an organic peroxide. The organic peroxide serves as a crosslinking initiator. The organic peroxide contributes to the durability and the resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. An organic peroxide with particularly high versatility is dicumyl peroxide.

The amount of the organic peroxide per 100 parts by weight of the base rubber is preferably not less than 0.1 parts by weight. The amount of deformation of the core 4 in which this amount is not less than 0.1 parts by weight is not excessively large when the golf ball 2 is hit. In the golf ball 2 having the core 4, the cover 6 is less likely to break. The golf ball 2 having the core 4 also has excellent resilience performance. From these viewpoints, this amount is more preferably not less than 0.3 parts by weight and particularly preferably not less than 0.5 parts by weight.

The amount of the organic peroxide per 100 parts by weight of the base rubber is preferably not greater than 3.0 parts by weight. The core 4 in which this amount is not greater than 3.0 parts by weight sufficiently deforms when the golf ball 2 is hit. The core 4 can achieve soft feel at impact for the golf ball 2. From this viewpoint, this amount is more preferably not greater than 2.5 parts by weight and particularly preferably not greater than 2.0 parts by weight.

Preferably, the rubber composition of the core 4 includes an organic sulfur compound. Organic sulfur compounds include naphthalenethiol compounds, benzenethiol compounds, and disulfide compounds.

Examples of naphthalenethiol compounds include 1-naphthalenethiol, 2-naphthalenethiol, 4-chloro-1-naphthalenethiol, 4-bromo-1-naphthalenethiol, 1-chloro-2-naphthalenethiol, 1-bromo-2-naphthalenethiol, 1-fluoro-2-naphthalenethiol, 1-cyano-2-naphthalenethiol, and 1-acetyl-2-naphthalenethiol.

Examples of benzenethiol compounds include benzenethiol, 4-chlorobenzenethiol, 3-chlorobenzenethiol, 4-bromobenzenethiol, 3-bromobenzenethiol, 4-fluorobenzenethiol, 4-iodobenzenethiol, 2,5-dichlorobenzenethiol, 3,5-dichlorobenzenethiol, 2,6-dichlorobenzenethiol, 2,5-dibromobenzenethiol, 3,5-dibromobenzenethiol, 2-chloro-5-bromobenzenethiol, 2,4,6-trichlorobenzenethiol, 2,3,4,5,6-pentachlorobenzenethiol, 2,3,4,5,6-pentafluorobenzenethiol, 4-cyanobenzenethiol, 2-cyanobenzenethiol, 4-nitrobenzenethiol, and 2-nitrobenzenethiol.

Examples of disulfide compounds include diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, bis(4-cyanophenyl)disulfide, bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, bis(2-cyano-5-bromophenyl)disulfide, bis(2,4,6-trichlorophenyl)disulfide, bis(2-cyano-4-chloro-6-bromophenyl)disulfide, bis(2,3,5,6-tetrachlorophenyl)disulfide, bis(2,3,4,5,6-pentachlorophenyl)disulfide, and bis(2,3,4,5,6-pentabromophenyl)disulfide.

In light of resilience performance of the golf ball 2, the amount of the organic sulfur compound per 100 parts by weight of the base rubber is preferably not less than 0.1 parts by weight and particularly preferably not less than 0.2 parts by weight. In light of soft feel at impact, the amount is preferably not greater than 1.5 parts by weight, more preferably not greater than 1.0 parts by weight, and particularly preferably not greater than 0.8 parts by weight. Two or more organic sulfur compounds may be used in combination.

The rubber composition of the core 4 may include a filler for the purpose of specific gravity adjustment and the like. Examples of suitable fillers include zinc oxide, barium sulfate, calcium carbonate, and magnesium carbonate. The amount of the filler is determined as appropriate so that the intended specific gravity of the core 4 is accomplished. The rubber composition may include various additives, such as sulfur, a carboxylic acid, a carboxylate, an anti-aging agent, a coloring agent, a plasticizer, a dispersant, and the like, in an adequate amount. The rubber composition may include crosslinked rubber powder or synthetic resin powder.

The core 4 preferably has a diameter of not less than 39.0 mm. In the golf ball 2 having the core 4 that has a diameter of not less than 39.0 mm, the cover 6 is thin. Therefore, the golf ball 2 has excellent feel at impact. Furthermore, the golf ball 2 has excellent resilience performance. From these viewpoints, the diameter is more preferably not less than 39.3 mm and particularly preferably not less than 39.8 mm. In light of durability of the golf ball 2, the diameter is preferably not greater than 42.0 mm, more preferably not greater than 41.5 mm, and particularly preferably not greater than 41.1 mm.

The core 4 preferably has an amount of compressive deformation S of not less than 3.0 mm. The core 4 having an amount of compressive deformation S of not less than 3.0 mm sufficiently deforms when the golf ball 2 is hit. The core 4 can achieve soft feel at impact for the golf ball 2. From this viewpoint, the amount of compressive deformation S is more preferably not less than 3.5 mm and particularly preferably not less than 4.0 mm. In light of resilience performance of the golf ball 2, the amount of compressive deformation S is preferably not greater than 5.5 mm, more preferably not greater than 5.3 mm, and particularly preferably not greater than 5.2 mm.

For measurement of the amount of compressive deformation S, a YAMADA type compression tester "SCH" is used. In the tester, the core 4 is placed on a hard plate made of metal. Next, a cylinder made of metal gradually descends toward the core 4. The core 4, squeezed between the bottom face of the cylinder and the hard plate, becomes deformed. A migration distance of the cylinder, starting from the state in which an initial load of 98 N is applied to the core 4 up to the state in which a final load of 1274 N is applied thereto, is measured. A moving speed of the cylinder until the initial load is applied is 0.83 mm/s. A moving speed of the cylinder after the initial load is applied until the final load is applied is 1.67 mm/s.

The core 4 has a weight of preferably not less than 10 g and not greater than 42 g. The temperature for crosslinking the core 4 is not lower than 140° C. and not higher than 180° C. The time period for crosslinking the core 4 is not shorter than 10 minutes and not longer than 60 minutes.

The cover 6 is positioned outside the core 4. The cover 6 is the outermost layer excluding the mark layer and the paint layer. The cover 6 is formed from a thermoplastic resin composition. Examples of the base polymer of the resin composition include ionomer resins, thermoplastic polyester elastomers, thermoplastic polyamide elastomers, thermoplastic polyurethane elastomers, thermoplastic polyolefin elastomers, and thermoplastic polystyrene elastomers. Ionomer resins are particularly preferable. Ionomer resins are highly elastic. The golf ball 2 having the cover 6 that includes an ionomer resin has excellent resilience performance. The cover 6 may be formed from a thermosetting resin composition.

An ionomer resin and another resin may be used in combination. In this case, in light of resilience performance, the ionomer resin is included as the principal component of the base polymer. The proportion of the ionomer resin to the entire base polymer is preferably not less than 50% by weight, more preferably not less than 70% by weight, and particularly preferably not less than 85% by weight.

Examples of preferable ionomer resins include binary copolymers formed with an α-olefin and an α,β-unsaturated carboxylic acid having 3 to 8 carbon atoms. A preferable binary copolymer includes 80% by weight or more but 90% by weight or less of an α-olefin, and 10% by weight or more but 20% by weight or less of an α,β-unsaturated carboxylic acid. The binary copolymer has excellent resilience performance. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer includes 70% by weight or more but 85% by weight or less of an α-olefin, 5% by weight or more but 30% by weight or less of an α,β-unsaturated carboxylic acid, and 1% by weight or more but 25% by weight or less of an α,β-unsaturated carboxylate ester. The ternary copolymer has excellent resilience performance. For the binary copolymer and the ternary copolymer, preferable α-olefins are ethylene and propylene, while preferable α,β-unsaturated carboxylic acids are acrylic acid and methacrylic acid. A particularly preferable ionomer resin is a copolymer formed with ethylene and acrylic acid. Another particularly preferable ionomer resin is a copolymer formed with ethylene and methacrylic acid.

In the binary copolymer and the ternary copolymer, some of the carboxyl groups are neutralized with metal ions. Examples of metal ions for use in neutralization include sodium ion, potassium ion, lithium ion, zinc ion, calcium ion, magnesium ion, aluminum ion, and neodymium ion. The neutralization may be carried out with two or more types of metal ions. Particularly suitable metal ions in light of resilience performance and durability of the golf ball 2 are sodium ion, zinc ion, lithium ion, and magnesium ion.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7329", and "Himilan AM7337", manufactured by Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", manufactured by E.I. du Pont de Nemours and Company; and trade names "IOTEK 7010", "IOTEK 7030", "IOTEK 7510", "IOTEK 7520", "IOTEK 8000", and "IOTEK 8030", manufactured by ExxonMobil Chemical Corporation. Two or more ionomer resins may be used in combination.

The resin composition of the cover 6 may include a styrene block-containing thermoplastic elastomer. The styrene block-containing thermoplastic elastomer includes a polystyrene block as a hard segment, and a soft segment. A typical soft segment is a diene block. Examples of compounds for the diene block include butadiene, isoprene, 1,3-pentadiene, and 2,3-dimethyl-1,3-butadiene. Butadiene and isoprene are preferable. Two or more compounds may be used in combination.

Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of resilience performance of the golf ball 2, the content of the styrene component in the styrene block-containing thermoplastic elastomer is preferably not less than 10% by weight, more preferably not less than 12% by weight, and particularly preferably not less than 15% by weight. In light of feel at impact of the golf ball 2, the content is preferably not greater than 50% by weight, more preferably not greater than 47% by weight, and particularly preferably not greater than 45% by weight.

In the present invention, styrene block-containing thermoplastic elastomers include an alloy of an olefin and one or more members selected from the group consisting of SBS, SIS, SIBS, SEBS, SEPS, and SEEPS. The olefin component in the alloy is presumed to contribute to improvement of compatibility with another base polymer. The alloy can contribute to the resilience performance of the golf ball 2. An olefin having 2 to 10 carbon atoms is preferable. Examples of suitable olefins include ethylene, propylene, butene, and pentene. Ethylene and propylene are particularly preferable.

Specific examples of polymer alloys include trade names "RABALON T3221C", "RABALON T3339C", "RABALON SJ4400N", "RABALON SJ5400N", "RABALON SJ6400N", "RABALON SJ7400N", "RABALON SJ8400N", "RABALON SJ9400N", and "RABALON SR04", manufactured by Mitsubishi Chemical Corporation. Other specific examples of styrene block-containing thermoplastic elastomers include trade name "Epofriend A1010" manufactured by Daicel Chemical Industries, Ltd., and trade name "SEPTON HG-252" manufactured by Kuraray Co., Ltd.

In light of feel at impact, the proportion of the styrene block-containing thermoplastic elastomer to the entire base polymer is preferably not less than 2% by weight, more preferably not less than 4% by weight, and particularly preferably not less than 6% by weight. In light of durability, this proportion is preferably not greater than 30% by weight, more preferably not greater than 25% by weight, and particularly preferably not greater than 20% by weight.

The resin composition of the cover 6 may include a coloring agent, a filler, a dispersant, an antioxidant, an ultraviolet absorber, a light stabilizer, a fluorescent material, a fluorescent brightener, and the like in an adequate amount. When the hue of the golf ball 2 is white, a typical coloring agent is titanium dioxide.

The cover 6 preferably has a thickness T of not greater than 1.70 mm. The cover 6 having a thickness T of not greater than 1.70 mm does not impair soft feel at impact. From this viewpoint, the thickness T is more preferably not greater than 1.60 mm and particularly preferably not greater than 1.50 mm. In light of ease of forming the cover 6 and in light of durability of the golf ball 2, the thickness T is preferably not less than 0.60 mm, more preferably not less than 0.70 mm, and particularly preferably not less than 0.80 mm. The thickness T is measured at a position immediately below the land 10.

The cover 6 preferably has a volume V of not greater than 7000 $mm^3$. The cover 6 having a volume V of not greater than 7000 $mm^3$ does not impair soft feel at impact. From this viewpoint, the volume V is more preferably not greater than 6000 $mm^3$ and particularly preferably not greater than 5500 $mm^3$. In light of ease of forming the cover 6 and in light of durability of the golf ball 2, the volume V is preferably not less than 3000 $mm^3$, more preferably not less than 3500 $mm^3$, and particularly preferably not less than 3800 $mm^3$.

The volume V of the cover 6 can be calculated by the following mathematical formula.

$$V = Vb - Vc - W$$

In the mathematical formula, Vb represents the volume of the phantom sphere of the golf ball 2, Vc represents the volume of the core 4, and W represents the total volume of the dimples 8. The meaning of the phantom sphere will be described in detail later. The meaning of the total volume of the dimples 8 will be described in detail later.

The cover 6 preferably has a hardness H of not greater than 62. The cover 6 having a hardness H of not greater than 62 does not impair feel at impact. From this viewpoint, the hardness H is more preferably not greater than 60 and particularly preferably not greater than 58. In light of scuff resistance, the hardness H is preferably not less than 50, more preferably not less than 52, and particularly preferably not less than 54.

The hardness H of the cover 6 is measured according to the standards of "ASTM-D 2240-68". The hardness H is measured with a Shore D type hardness scale mounted to an automated hardness meter (trade name "digi test II" manufactured by Heinrich Bareiss Prufgeratebau GmbH). For the measurement, a sheet that is formed by hot press, is formed from the same material as that of the cover 6, and has a thickness of about 2 mm, is used. Prior to the measurement, a sheet is kept at 23° C. for two weeks. At the time of measurement, three sheets are stacked.

The ratio (V/S) of the volume V (mm³) of the cover 6 to the amount of compressive deformation S (mm) of the core 4 is not less than 1000 and not greater than 1900. The golf ball 2 having a ratio (V/S) of not less than 1000 has excellent durability. From this viewpoint, the ratio (V/S) is more preferably not less than 1050 and particularly preferably not less than 1090. The golf ball 2 having a ratio (V/S) of not greater than 1900 has excellent feel at impact. From this viewpoint, the ratio (V/S) is more preferably not greater than 1850 and particularly preferably not greater than 1800.

Figure 2:
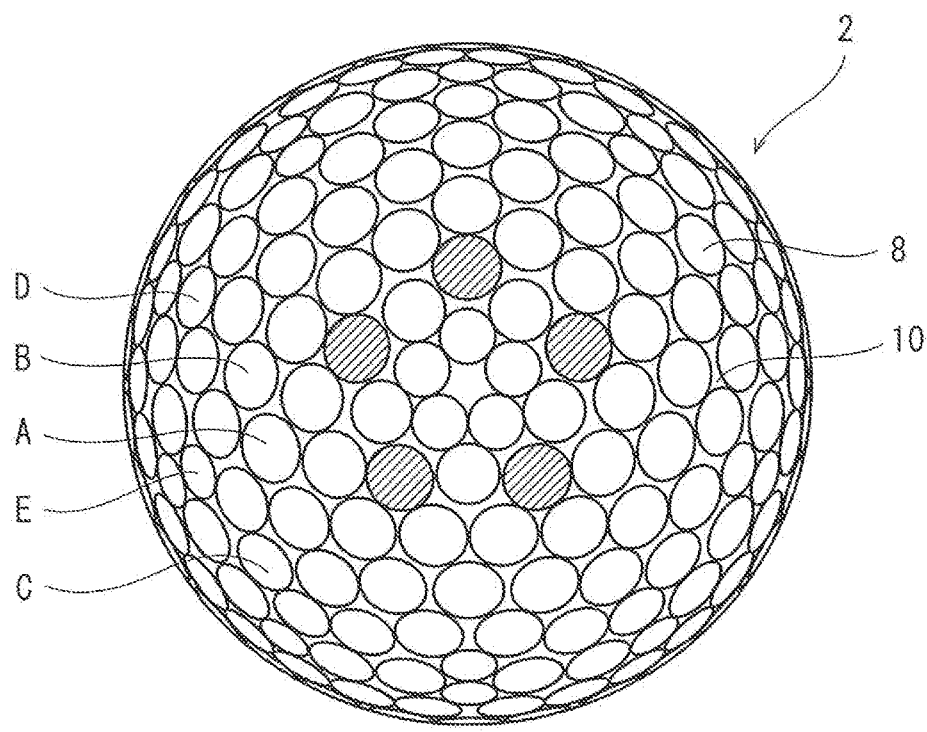
FIG. 2 is a plan view of the golf ball in FIG. 1.
Figure 3:
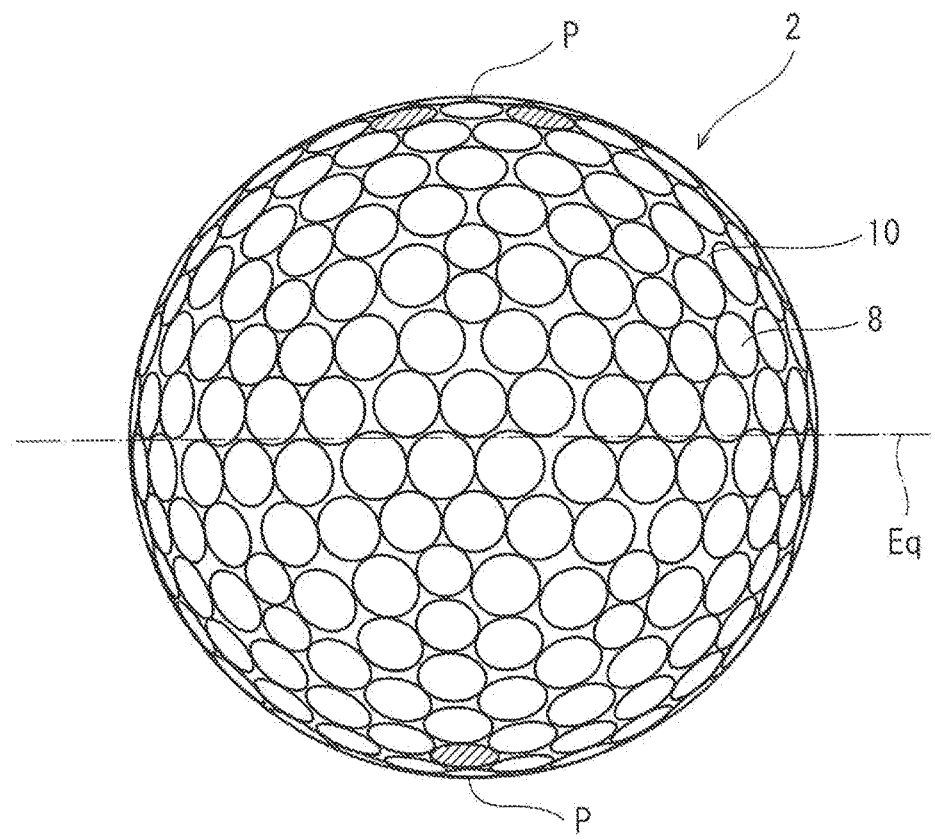
FIG. 3 is a front view of the golf ball in FIG. 2.

FIG. 2 is a plan view of the golf ball 2 in FIG. 1, and FIG. 3 is a front view of the golf ball 2. In FIG. 3, an alternate long and short dashes line Eq indicates an equator, and reference character P indicates poles. Each pole P corresponds to the deepest position of a mold for the golf ball 2. The latitude of the equator Eq is zero. The latitude of each pole P is 90°.

As shown in FIGS. 2 and 3, the contours of most dimples 8 are circular. The golf ball 2 has dimples A each having a diameter of 4.40 mm; dimples B each having a diameter of 4.30 mm; dimples C each having a diameter of 4.20 mm; dimples D each having a diameter of 3.95 mm; and dimples E each having a diameter of 3.50 mm. The golf ball 2 may have non-circular dimples 8 instead of or together with circular dimples 8. A dimple 8 of which a contour shape is exactly an ellipse is also referred to as a circular dimple 8 in the present invention.

The number of the dimples A is 30; the number of the dimples B is 140; the number of the dimples C is 90; the number of the dimples D is 40; and the number of the dimples E is 40. The total number of the dimples 8 is 340. A dimple pattern is formed by these dimples 8 and the land 10.

Figure 4:
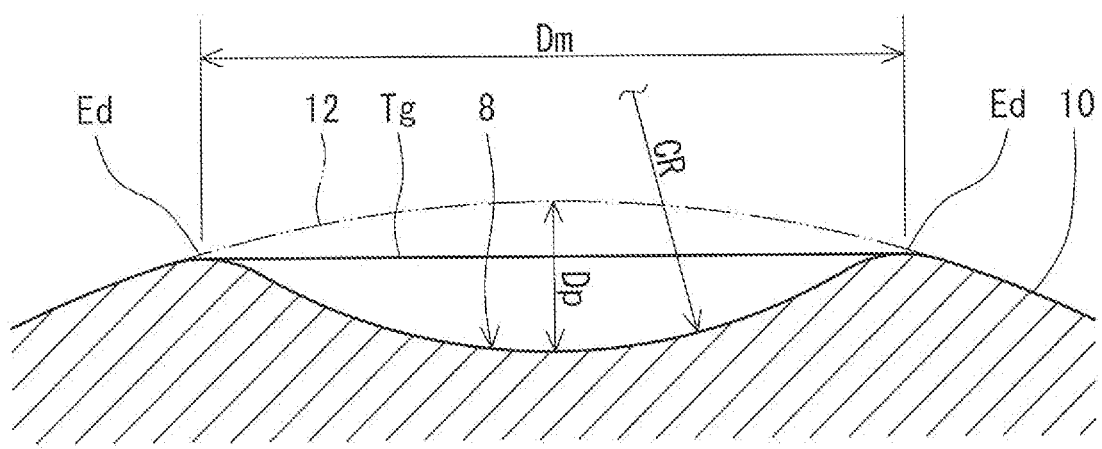
FIG. 4 is a partially enlarged cross-sectional view of the golf ball in FIG. 1.

FIG. 4 shows a cross section of the golf ball 2 along a plane passing through the central point of the dimple 8 and the central point of the golf ball 2. In FIG. 4, the top-to-bottom direction is the depth direction of the dimple 8. In FIG. 4, an alternate long and two short dashes line 12 indicates a phantom sphere. The surface of the phantom sphere 12 is the surface of the golf ball 2 when it is postulated that no dimple 8 exists. The diameter of the phantom sphere 12 is equal to the diameter of the golf ball 2. The dimple 8 is recessed from the surface of the phantom sphere 12. The land 10 coincides with the surface of the phantom sphere 12. In the present embodiment, the cross-sectional shape of each dimple 8 is substantially a circular arc. The cross-sectional shape may be a curved line of which the curvature changes.

In FIG. 4, an arrow Dm indicates the diameter of the dimple 8. The diameter Dm is the distance between two tangent points Ed appearing on a tangent line Tg that is drawn tangent to the far opposite ends of the dimple 8. Each tangent point Ed is also the edge of the dimple 8. The edge Ed defines the contour of the dimple 8. In FIG. 4, a double ended arrow Dp indicates the depth of the dimple 8. The depth Dp is the distance between the deepest point of the dimple 8 and the surface of the phantom sphere 12.

The diameter Dm of each dimple 8 is preferably not less than 2.0 mm and not greater than 6.0 mm. The dimple 8 having a diameter Dm of not less than 2.0 mm disturbs the air flow around the golf ball 2 when the golf ball 2 flies. This phenomenon is referred to as turbulization. Owing to the turbulization, a large flight distance of the golf ball 2 is achieved. From this viewpoint, the diameter Dm is more preferably not less than 2.5 mm and particularly preferably not less than 2.8 mm. The dimple 8 having a diameter Dm of not greater than 6.0 mm does not impair a fundamental feature of the golf ball 2 being substantially a sphere. From this viewpoint, the diameter Dm is more preferably not greater than 5.5 mm and particularly preferably not greater than 5.0 mm.

The area Ar of the dimple 8 is the area of a region surrounded by the contour line of the dimple 8 when the central point of the golf ball 2 is viewed at infinity. In the case of a circular dimple 8, the area Ar is calculated by the following mathematical formula.

$$Ar=(Dm/2)^2*\pi$$

In the golf ball 2 shown in FIGS. 2 and 3, the area Ar of each dimple A is 15.2 mm²; the area Ar of each dimple B is 14.5 mm²; the area Ar of each dimple C is 13.9 mm²; the area Ar of each dimple D is 12.3 mm²; and the area Ar of each dimple E is 9.6 mm².

In light of suppression of rising of the golf ball 2 during flight, the depth Dp of each dimple 8 is preferably not less than 0.10 mm, more preferably not less than 0.15 mm, and particularly preferably not less than 0.17 mm. In light of suppression of dropping of the golf ball 2 during flight, the depth Dp is preferably not greater than 0.60 mm, more preferably not greater than 0.50 mm, and particularly preferably not greater than 0.40 mm.

In the present invention, the "volume of the dimple" means the volume of a portion surrounded by the surface of the phantom sphere 12 and the surface of the dimple 8. The total volume W of the dimples 8 is preferably not less than 490 mm³ and not greater than 620 mm³. With the golf ball 2 having a total volume W of not less than 490 mm³, rising of the golf ball 2 during flight is suppressed. From this viewpoint, the total volume W is more preferably not less than 520 mm³ and particularly preferably not less than 530 mm³. With the golf ball 2 having a total volume W of not greater than 620 mm³, dropping of the golf ball 2 during flight is suppressed. From this viewpoint, the total volume W is more preferably not greater than 600 mm³ and particularly preferably not greater than 580 mm³.

The number of the dimples 8 is preferably not less than 300 and not greater than 400. In a mold for the golf ball 2 in which the number of the dimples 8 is in this range, the thicknesses of support pins described in detail later are appropriate. From this viewpoint, the number of the dimples 8 is more preferably not less than 310 and not greater than 390, and particularly preferably not less than 320 and not greater than 380.

Figure 5:
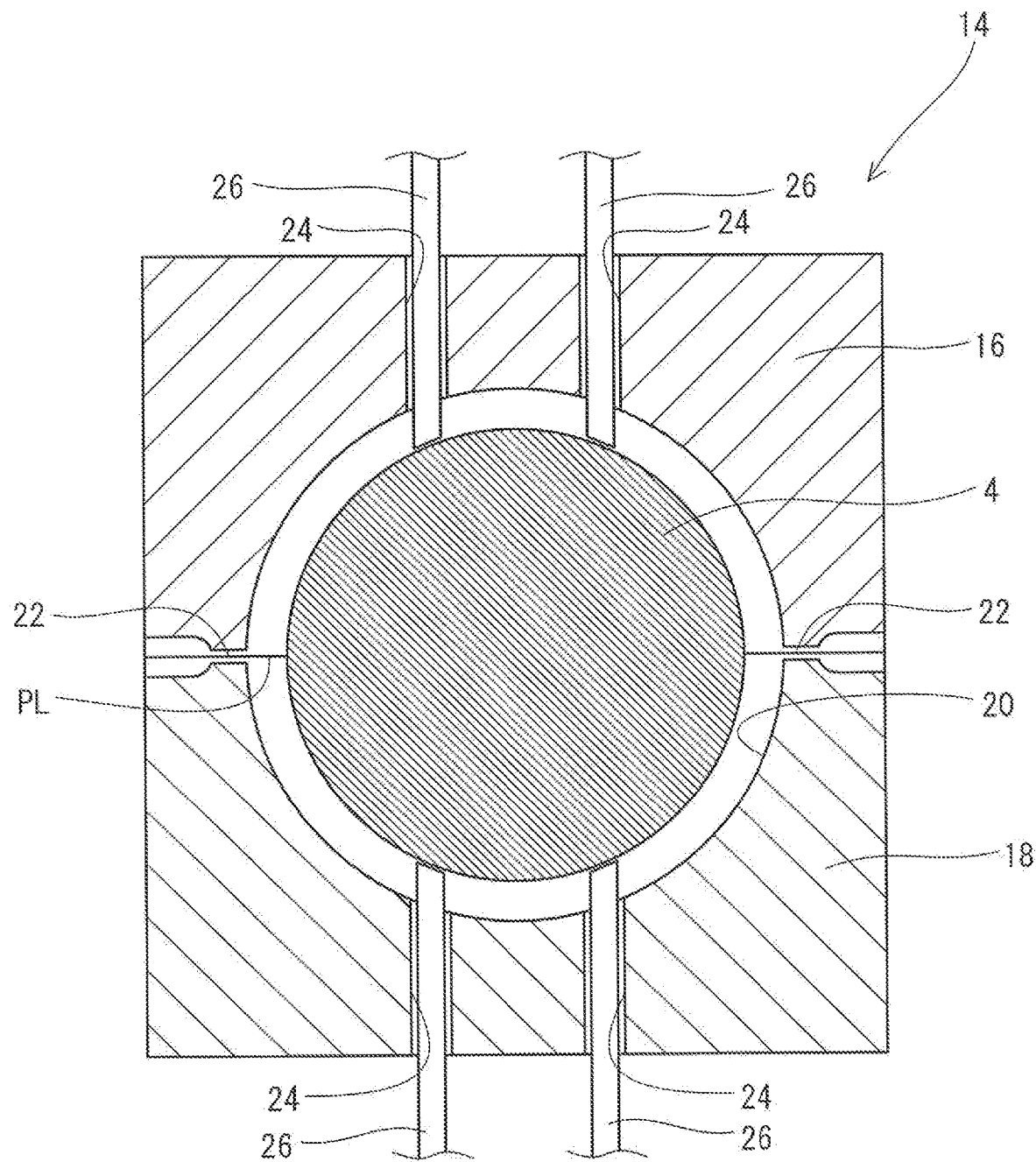
FIG. 5 is a cross-sectional view of a mold for the golf ball in FIG. 1, with a core of the golf ball.

FIG. 5 shows a mold 14 for the golf ball 2 in FIG. 1. In FIG. 5, the core 4 is also shown. The mold 14 has an upper mold half 16 and a lower mold half 18. When the upper mold half 16 and the lower mold half 18 are mated with each other, a cavity is formed. The mold 14 has a cavity face 20.

A parting line PL between the upper mold half 16 and the lower mold half 18 corresponds to the equator Eq of the golf ball 2. The parting line PL may be slightly displaced from the equator Eq. The parting line PL may have a zigzag shape. A plurality of gates 22 are present on the parting line PL. These gates 22 are aligned along the equator of the cavity. The gates 22 may be slightly displaced from the equator. The latitude of an opening of each gate 22 that is formed in the cavity face 20 is preferably not less than 0° and not greater than 20°. In the mold 14 shown in FIG. 5, this latitude is zero.

The upper mold half 16 has a plurality of pin holes 24 and a plurality of support pins 26. Each support pin 26 is passed through the pin hole 24. The support pin 26 can advance in the downward direction in FIG. 5. The support pin 26 can retract in the upward direction in FIG. 5.

The lower mold half 18 has a plurality of pin holes 24 and a plurality of support pins 26. Each support pin 26 is passed through the pin hole 24. The support pin 26 can advance in the upward direction in FIG. 5. The support pin 26 can retract in the downward direction in FIG. 5.

Figure 6:
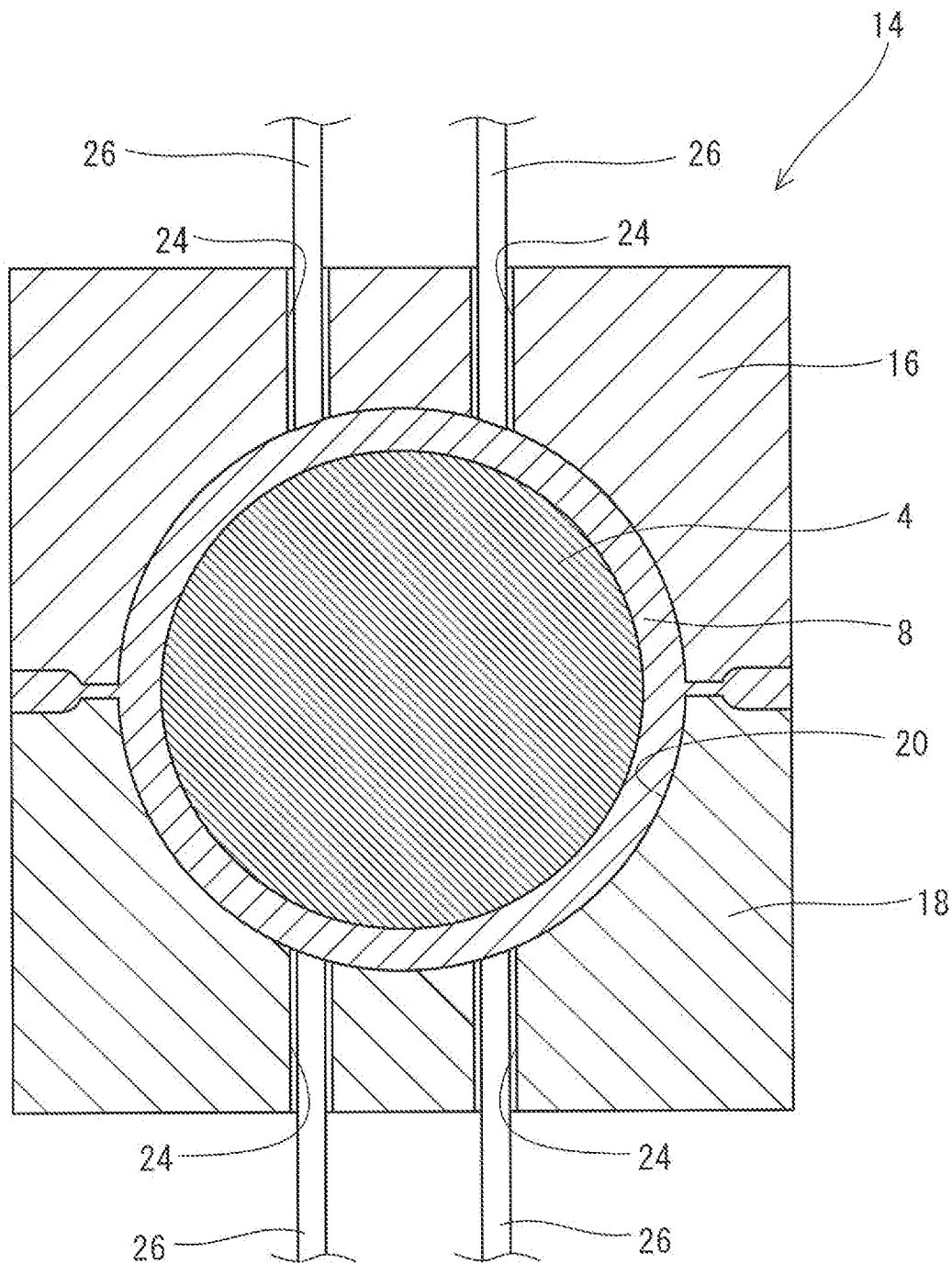
FIG. 6 is a cross-sectional view of the mold in FIG. 5, with the core and a cover.

The core 4 is placed into the mold 14, and the upper mold half 16 and the lower mold half 18 are mated with each other. The support pins 26 moves toward the core 4, and leading ends of the support pins 26 come into contact with the core 4. The core 4 is held at the center of the cavity by these support pins 26. A state where the core 4 is held is shown in FIG. 5. A melted resin composition is injected through the gates 22 toward the space between the cavity face 20 and the core 4. The resin composition flows toward the poles of the cavity. Immediately before the injection of the resin composition is completed, the support pins 26 retract. Each support pin 26 retracts to a position at which the leading end thereof substantially coincides with the cavity face 20. Spaces formed as a result of the retraction of the support pins 26 are also filled with the resin composition. The resin composition becomes solidified, whereby the cover 6 is formed. In FIG. 6, the mold 14 immediately after the formation of the cover 6 is completed is shown.

Figure 7:
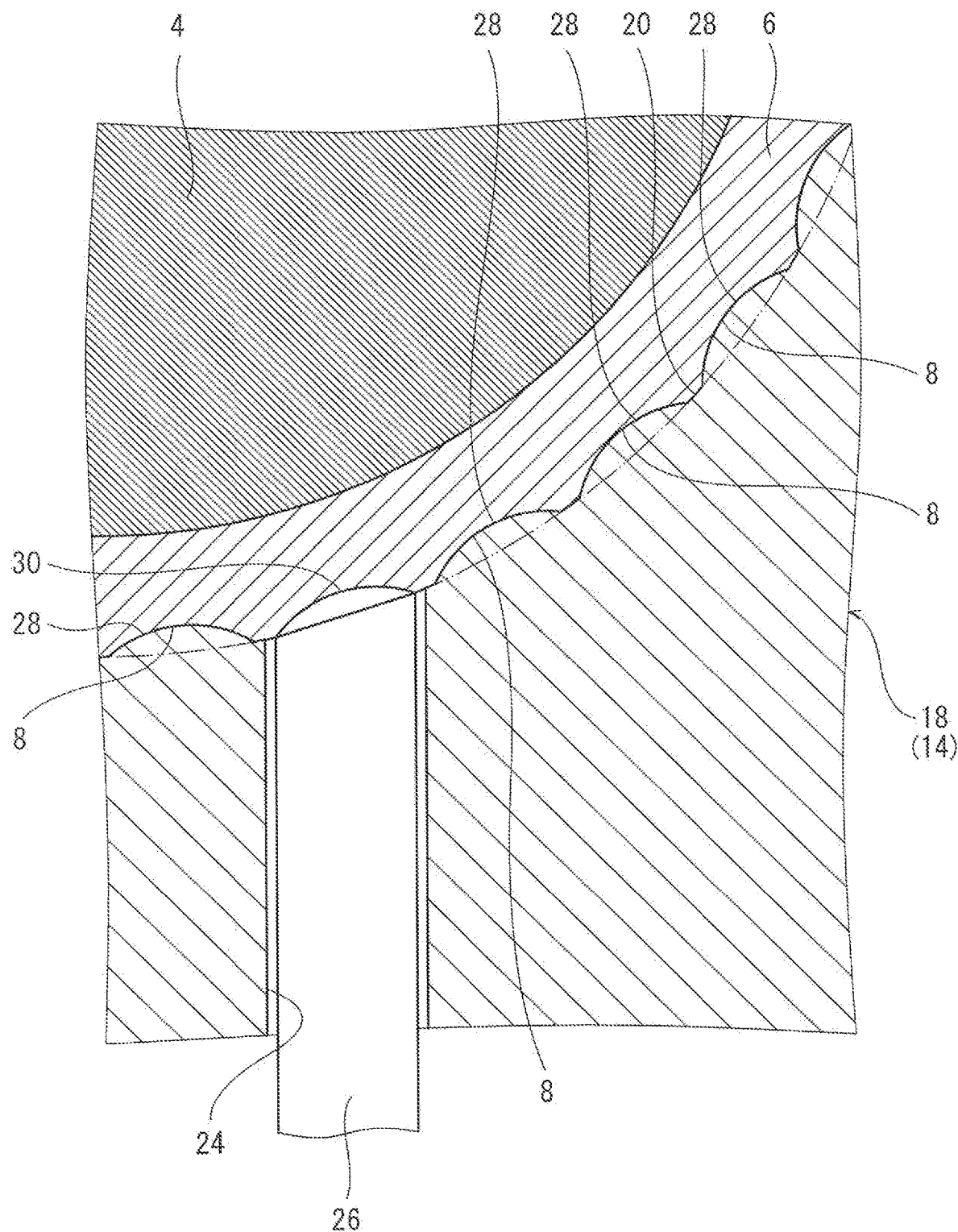
FIG. 7 is a partially enlarged view of the mold in FIG. 6, with the core and the cover.

FIG. 7 is a partially enlarged view of the mold 14 in FIG. 6 with the core 4 and the cover 6. In FIG. 7, the lower mold half 18 is shown. The upper mold half 16 has a shape that is obtained by vertically inverting the shape shown in FIG. 7. The cavity face 20 of the mold 14 has a large number of first pimples 28. Dimples 8 are formed at portions of the surface of the cover 6 that are in contact with the respective first pimples 28. The dimples 8 have a shape that is the inverted shape of the first pimples 28.

As shown in FIG. 7, the support pin 26 has a second pimple 30 at the leading end thereof. Dimples 8 are formed at portions of the surface of the cover 6 that are in contact with the respective second pimples 30. The dimples 8 have a shape that is the inverted shape of the second pimples 30. In the case where a cross-section of the support pin 26 that is perpendicular to the axial direction thereof has a circular shape, the contour of the second pimple 30 is substantially an ellipse. Therefore, the shape of the dimple 8 that is in contact with the second pimple 30 is not exactly a circle but an ellipse. In the present invention, this elliptical dimple 8 is also referred to as a "circular dimple". One support pin 26 may have two second pimples 30.

The dimples 8 that are not hatched in FIGS. 2 and 3 are formed by the first pimples 28. The dimples 8 that are hatched in FIGS. 2 and 3 are formed by the second pimples 30. The mold 14 has five support pins 26 in the upper mold half 16 and five support pins 26 in the lower mold half 18. Therefore, the number of the support pins 26 is 10. The golf ball 2 has ten dimples 8 that are formed by the second pimples 30.

The number of the support pins 26 is preferably not less than 8 and not greater than 12. With the mold 14 in which this number is not less than 8, the melted resin composition can be injected while the core 4 is firmly held. Therefore, with the mold 14, eccentricity can be suppressed. The structure of the mold 14 in which this number is not greater than 12 is simple. In addition, with the mold 14 in which this number is not greater than 12, the golf ball 2 having excellent appearance can be produced.

Figure 8:
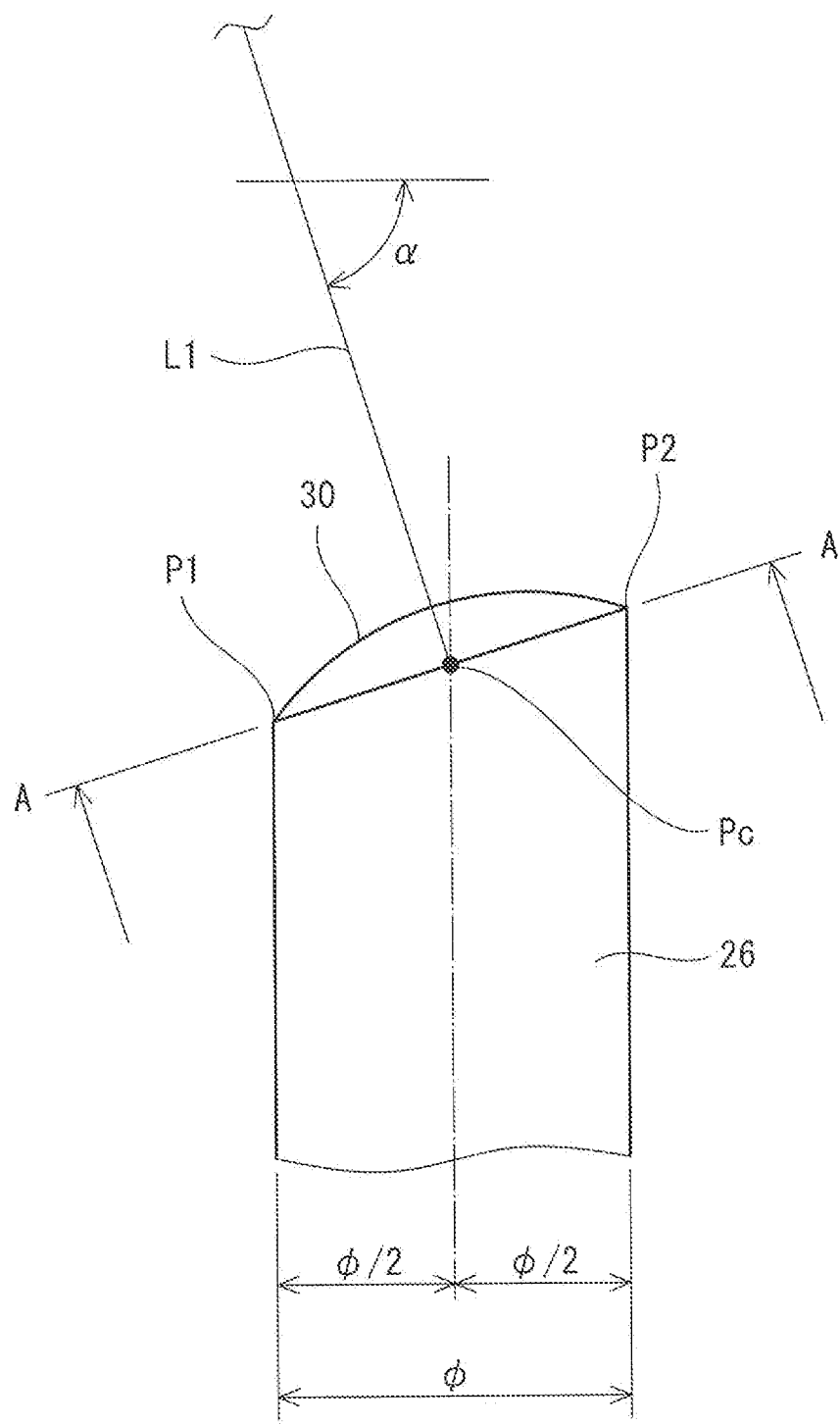
FIG. 8 is a partially enlarged view of a support pin of the mold in FIG. 7.

FIG. 8 is a partially enlarged view of the support pin 26 of the mold 14 in FIG. 7. In FIG. 8, reference character P1 indicates a point in the second pimple 30 that is closest to the pole, and reference character P2 indicates a point in the second pimple 30 that is closest to the equator. Reference character Pc indicates the midpoint of a straight line connecting the point P1 and the point P2. Reference character L1 indicates a straight line passing through the midpoint Pc and the center of the cavity (not shown). An arrow a indicates the angle between the straight line L1 and the horizontal direction. The angle α is also the latitude of the point Pc. In the present invention, the angle α is referred to as a "latitude of the support pin".

The latitude α is preferably not less than 60° and not greater than 78°. With the mold 14 having a latitude α of not less than 60°, the golf ball 2 having excellent appearance and durability can be obtained. From this viewpoint, the latitude α is more preferably not less than 65° and particularly preferably not less than 68°. With the mold 14 having a latitude α of not greater than 78°, eccentricity can be suppressed. From this viewpoint, the latitude α is more preferably not greater than 75° and particularly preferably not greater than 72°.

A total cross-sectional area P of the support pins 26 is preferably not less than 80 mm$^2$ and not greater than 200 mm$^2$. With the mold 14 having a total cross-sectional area P of not less than 80 mm$^2$, eccentricity can be suppressed. From this viewpoint, the total cross-sectional area P is more preferably not less than 100 mm$^2$ and particularly preferably not less than 110 mm$^2$. With the mold 14 having a total cross-sectional area P of not greater than 200 mm$^2$, the golf ball 2 having excellent appearance and durability can be obtained. From this viewpoint, the total cross-sectional area P is more preferably not greater than 190 mm$^2$ and particularly preferably not greater than 180 mm$^2$.

In the present invention, for convenience's sake, a cross-sectional area of the support pin 26 is measured on the surface of the golf ball 2. On the surface of the golf ball 2, the direct distance between a position corresponding to the point P1 and a position corresponding to the point P2 is measured. A circle having a diameter equal to this distance is assumed. For convenience's sake, the area of this circle is regarded as the cross-sectional area of the support pin 26. In the present embodiment, since the number of the support pins 26 is 10, ten times the cross-sectional area of the support pin 26 is the total cross-sectional area P.

The ratio (α/P) of the latitude α (degree) of the support pin 26 to the total cross-sectional area P (mm$^2$) is preferably not less than 0.35 and not greater than 0.60. With the mold 14 having a ratio (α/P) of not less than 0.35, the golf ball 2 having excellent appearance and durability can be obtained. Furthermore, with the mold 14 having a ratio (α/P) of not less than 0.35, eccentricity can be suppressed. From these viewpoints, the ratio (α/P) is more preferably not less than 0.38 and particularly preferably not less than 0.40. With the mold 14 having a ratio (α/P) of not greater than 0.60, eccentricity can be suppressed. From this viewpoint, the ratio (α/P) is more preferably not greater than 0.58 and particularly preferably not greater than 0.55.

EXAMPLES

Example 1

A rubber composition b was obtained by kneading 100 parts by weight of a high-cis polybutadiene (trade name "BR-730", manufactured by JSR Corporation), 25.4 parts by weight of zinc diacrylate, 5 parts by weight of zinc oxide, an appropriate amount of barium sulfate, 0.5 parts by weight of diphenyl disulfide, and 0.9 parts by weight of dicumyl peroxide. This rubber composition b was placed into a mold including upper and lower mold halves each having a hemispherical cavity, and heated at 160° C. for 20 minutes to obtain a core with a diameter of 40.5 mm.

A resin composition #1 was obtained by kneading 47 parts by weight of an ionomer resin (the aforementioned "Himilan 1555"), 46 parts by weight of another ionomer resin (the aforementioned "Himilan 1557"), 7 parts by weight of a styrene block-containing thermoplastic elastomer (the aforementioned "Rabalon T3221C"), 4 parts by weight of titanium dioxide, and 0.2 parts by weight of a light stabilizer (trade name "JF-90", manufactured by Johoku Chemical Co., Ltd.) with a twin-screw kneading extruder. The core was placed into the mold shown in FIGS. 5 to 8. The melted resin composition #1 was injected so as to cover the core to form a cover. The thickness of the cover was 1.10 mm. Dimples having a shape that is the inverted shape of the pimples were formed on the cover.

A clear paint including a two-component curing type polyurethane as a base material was applied to this cover to obtain a golf ball of Example 1 with a diameter of about 42.7 mm and a weight of about 45.6 g. The dimple pattern of the golf ball and the positions of the support pins are shown in FIGS. 2 and 3. Specifications (ii) of the dimples of the golf ball are shown in detail in Table 3 below.

Examples 2 to 8 and Comparative Examples 1 to 7

Golf balls of Examples 2 to 8 and Comparative Examples 1 to 7 were obtained in the same manner as Example 1, except the specifications of the core, the cover, and the dimples were as shown in Tables 4 to 6 below. The composition of the core is shown in detail in Table 1 below. The composition of the cover is shown in detail in Table 2 below. The specifications of the dimples are shown in detail in Table 3 below.

[Durability]

A golf ball was repeatedly collided against a metallic plate at a speed of 45 m/s, and the number of collisions required to break the golf ball was counted. The result is shown as an index in Tables 4 to 6 below.

[Feel at Impact]

Thirty golf players hit golf balls with drivers and were asked about feel at impact. The evaluation was categorized as follows on the basis of the number of golf players who answered, "The feel at impact was favorable".
A: 25 persons or more
B: 20 to 24 persons
C: 15 to 19 persons
D: 14 persons or less
The results are shown in Tables 4 to 6 below.

[Eccentricity]

A cover thickness near one pole of an injection-molded golf ball and a cover thickness near the other pole of the injection-molded golf ball were measured, and the difference therebetween was calculated. When the difference was not less than 20% of a nominal cover thickness (designed value), the golf ball was determined to have eccentricity. The evaluation was categorized as follows on the basis of the number of golf balls determined to have eccentricity among 120 golf balls.
A: 0
B: 1
C: 2
D: 3 or greater
The results are shown in Tables 4 to 6 below.

[Appearance]

Thirty golf players visually observed golf balls and were asked about impression on appearance. The evaluation was categorized as follows on the basis of the number of golf players who answered, "The appearance did not feel unnatural".
A: 25 persons or more
B: 20 to 24 persons
C: 15 to 19 persons
D: 14 persons or less
The results are shown in Tables 4 to 6 below.

[Flight Test]

A driver (trade name "XXIO", manufactured by DUNLOP SPORTS CO. LTD., shaft hardness: R, loft angle: 10.5°) was attached to a swing machine manufactured by Golf Laboratories, Inc. A golf ball was hit under a condition of a head speed of 40 m/sec, and the flight distance was measured. The flight distance is the distance between the point at the hit and the point at which the golf ball stopped. The average of values obtained by 12 measurements is shown in Tables 4 to 6 below.

TABLE 1

| Composition of Core (parts by weight) | | | | |
|---|---|---|---|---|
| | a | b | c | d |
| Polybutadiene BR-730 | 100 | 100 | 100 | 100 |
| Zinc diacrylate | 27.4 | 25.4 | 23.4 | 21.4 |
| Zinc oxide | 5 | 5 | 5 | 5 |
| Barium sulfate | A.A. | A.A. | A.A. | A.A. |
| Diphenyl disulfide | 0.5 | 0.5 | 0.5 | 0.5 |
| Dicumyl peroxide | 0.9 | 0.9 | 0.9 | 0.9 |

A.A.: Appropriate amount

TABLE 2

| Composition of Cover (parts by weight) | | | |
|---|---|---|---|
| | 1 | 2 | 3 |
| Himilan AM7329 | — | 40 | 63 |
| Himilan 1555 | 47 | — | 35 |
| Himilan 1557 | 46 | — | — |
| Himilan 1605 | — | 54 | — |
| RabalonT3221C | 7 | 6 | 2 |
| Titanium dioxide(A220) | 4 | 3 | 3 |
| JF-90 | 0.2 | 0.2 | 0.2 |
| Hardness HC (Shore D) | 57 | 60 | 63 |

TABLE 3

| | | Number | Dm (mm) | Dp (mm) | CR (mm) | Volume (mm³) | Total numb. | W (mm³) |
|---|---|---|---|---|---|---|---|---|
| (i) | A | 168 | 4.50 | 0.275 | 16.3 | 2.189 | 336 | 531.1 |
| | B | 168 | 3.40 | 0.214 | 10.0 | 0.972 | | |
| (ii) | A | 30 | 4.40 | 0.254 | 17.4 | 1.931 | 340 | 557.3 |
| | B | 140 | 4.30 | 0.249 | 16.6 | 1.807 | | |
| | C | 90 | 4.20 | 0.244 | 15.8 | 1.689 | | |
| | D | 40 | 3.95 | 0.227 | 14.5 | 1.390 | | |
| | E | 40 | 3.50 | 0.202 | 11.8 | 0.972 | | |
| (iii) | A | 30 | 4.40 | 0.224 | 22.1 | 1.702 | 340 | 487.9 |
| | B | 140 | 4.30 | 0.219 | 21.1 | 1.588 | | |
| | C | 90 | 4.20 | 0.214 | 20.1 | 1.480 | | |

TABLE 3-continued

Specifications of Dimples

| | | Number | Dm (mm) | Dp (mm) | CR (mm) | Volume (mm³) | Total numb. | W (mm³) |
|---|---|---|---|---|---|---|---|---|
| | D | 40 | 3.95 | 0.197 | 18.6 | 1.205 | | |
| | E | 40 | 3.50 | 0.172 | 15.4 | 0.827 | | |
| (iv) | A | 30 | 4.40 | 0.284 | 14.3 | 2.160 | 340 | 626.9 |
| | B | 140 | 4.30 | 0.279 | 13.7 | 2.026 | | |
| | C | 90 | 4.20 | 0.274 | 13.1 | 1.898 | | |
| | D | 40 | 3.95 | 0.257 | 11.9 | 1.575 | | |
| | E | 40 | 3.50 | 0.232 | 9.7 | 1.118 | | |
| (v) | A | 66 | 4.60 | 0.264 | 19.0 | 2.198 | 330 | 568.1 |
| | B | 48 | 4.40 | 0.254 | 17.4 | 1.931 | | |
| | C | 60 | 4.30 | 0.249 | 16.6 | 1.807 | | |
| | D | 30 | 4.20 | 0.244 | 15.8 | 1.689 | | |
| | E | 114 | 4.00 | 0.229 | 14.9 | 1.440 | | |
| | F | 12 | 2.90 | 0.179 | 8.2 | 0.593 | | |

TABLE 4

Results of Evaluation

Figure 9:
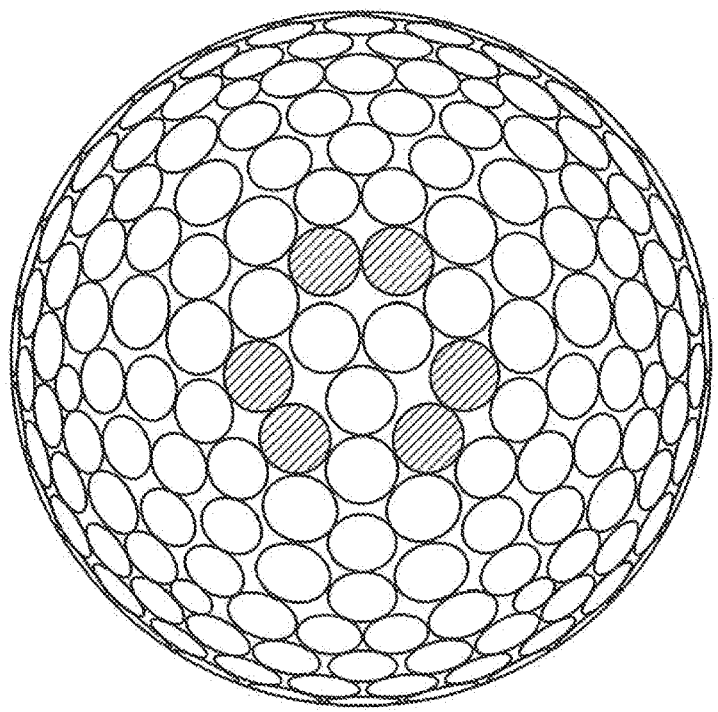
FIG. 9 is a plan view of a golf ball according to Example 2 of the present invention.
Figure 10:
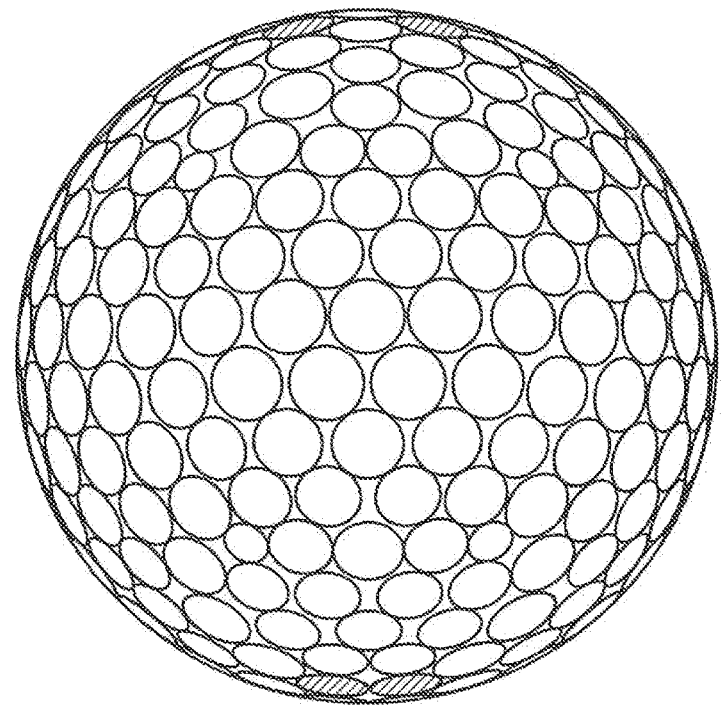
FIG. 10 is a front view of the golf ball in FIG. 9.

| | Example 2 | Comp. Example 1 | Comp. Example 2 | Example 1 | Comp. Example 3 |
|---|---|---|---|---|---|
| Core | | | | | |
| Composition | a | a | b | b | b |
| Dia. (mm) | 41.1 | 39.9 | 41.1 | 40.5 | 40.5 |
| S (mm) | 3.5 | 3.5 | 4.0 | 4.0 | 4.0 |
| Cover | | | | | |
| Composition | 1 | 1 | 1 | 1 | 1 |
| T (mm) | 0.80 | 1.40 | 0.80 | 1.10 | 1.10 |
| V (mm³) | 3845 | 6948 | 3845 | 424 | 5494 |
| H (Shore D) | 57 | 57 | 57 | 57 | 57 |
| Dimple | | | | | |
| Pattern | IV | III | IV | III | III |
| Plan view | FIG. 9 | FIG. 2 | FIG. 9 | FIG. 2 | FIG. 2 |
| Front view | FIG. 10 | FIG. 3 | FIG. 10 | FIG. 3 | FIG. 3 |
| Spec. | (v) | (ii) | (v) | (ii) | (iii) |
| W (mm³) | 568.1 | 557.3 | 568.1 | 557.3 | 487.9 |
| Support pin | | | | | |
| α (degree) | 72.5 | 70.0 | 72.5 | 70.0 | 70.0 |
| P (mm²) | 182.4 | 145.2 | 182.4 | 145.2 | 145.2 |
| Number | 12 | 10 | 12 | 10 | 10 |
| V/S | 1099 | 1985 | 961 | 1356 | 1373 |
| α/P | 0.40 | 0.48 | 0.40 | 0.48 | 0.48 |
| Durability | 82 | 100 | 70 | 91 | 91 |
| Feel at impact | A | D | A | A | A |
| Eccentricity | A | B | A | B | B |
| Appearance | C | A | C | A | A |
| Flight distance | 98 | 100 | 98 | 99 | 96 |

TABLE 5

Results of Evaluation

Figure 13:
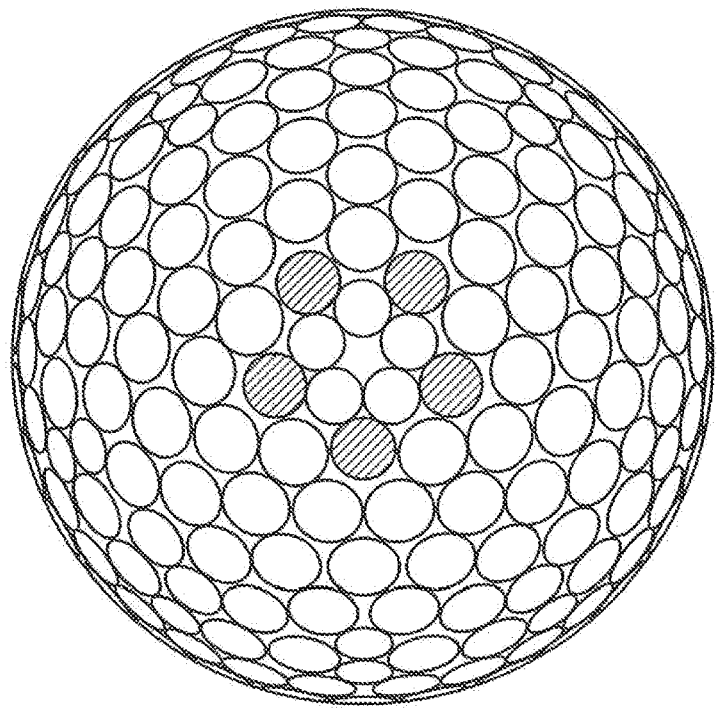
FIG. 13 is a plan view of a golf ball according to Comparative Example 5.
Figure 14:
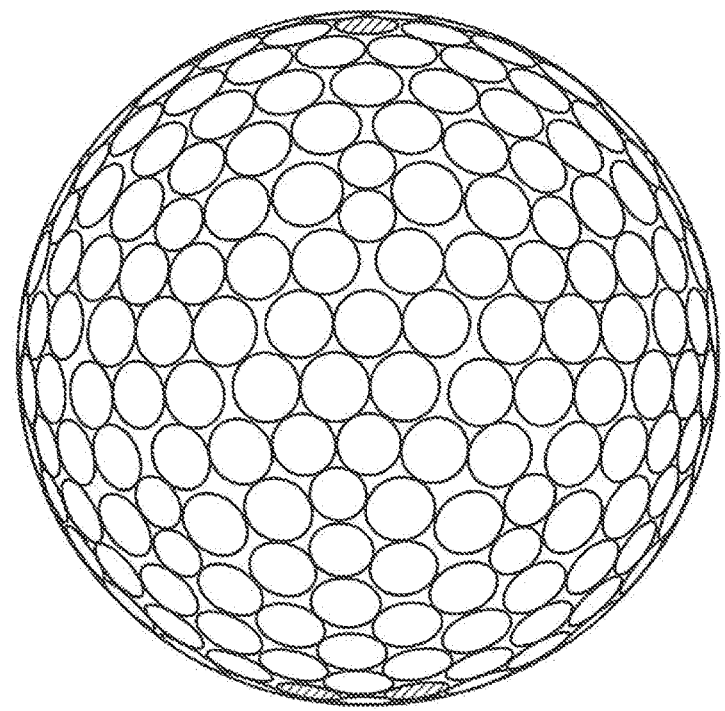
FIG. 14 is a front view of the golf ball in FIG. 13.

| | Comp. Example 4 | Comp. Example 5 | Example 3 | Comp. Example 6 | Example 4 |
|---|---|---|---|---|---|
| Core | | | | | |
| Composition | b | b | b | b | b |
| Dia. (mm) | 40.5 | 40.5 | 40.5 | 40.5 | 39.9 |
| S (mm) | 4.0 | 4.0 | 4.0 | 4.0 | 4.0 |
| Cover | | | | | |
| Composition | 1 | 1 | 2 | 3 | 1 |
| T (mm) | 1.10 | 1.10 | 1.10 | 1.10 | 1.40 |
| V (mm³) | 5355 | 5424 | 5424 | 5424 | 6937 |
| H (Shore D) | 57 | 57 | 60 | 63 | 57 |
| Dimple | | | | | |
| Pattern | III | I | III | III | IV |
| Plan view | FIG. 2 | FIG. 13 | FIG. 2 | FIG. 2 | FIG. 9 |
| Front view | FIG. 3 | FIG. 14 | FIG. 3 | FIG. 3 | FIG. 10 |
| Spec. | (iv) | (ii) | (ii) | (ii) | (v) |
| W (mm³) | 626.9 | 557.3 | 557.3 | 557.3 | 568.1 |
| Support pin | | | | | |
| α (degree) | 70.0 | 74.6 | 70.0 | 70.0 | 72.5 |
| P (mm²) | 145.2 | 122.6 | 145.2 | 145.2 | 182.4 |
| Number | 10 | 10 | 10 | 10 | 12 |
| V/S | 1339 | 1356 | 1356 | 1356 | 1734 |
| α/P | 0.48 | 0.61 | 0.48 | 0.48 | 0.40 |
| Durability | 91 | 91 | 81 | 76 | 100 |
| Feel at impact | A | A | B | D | C |
| Eccentricity | B | D | B | B | A |
| Appearance | A | A | A | A | C |
| Flight distance | 96 | 99 | 100 | 101 | 100 |

TABLE 6

Results of Evaluation

Figure 11:
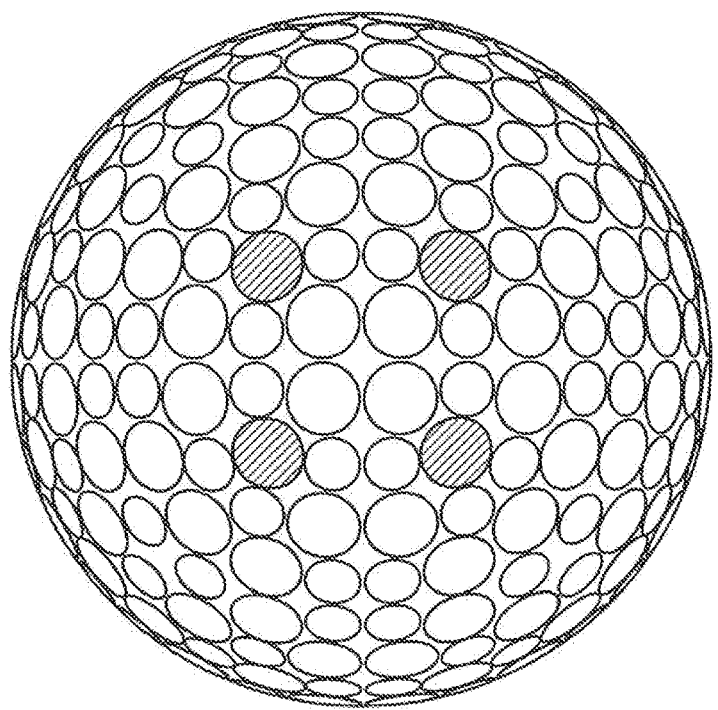
FIG. 11 is a plan view of a golf ball according to Example 5 of the present invention.
Figure 12:
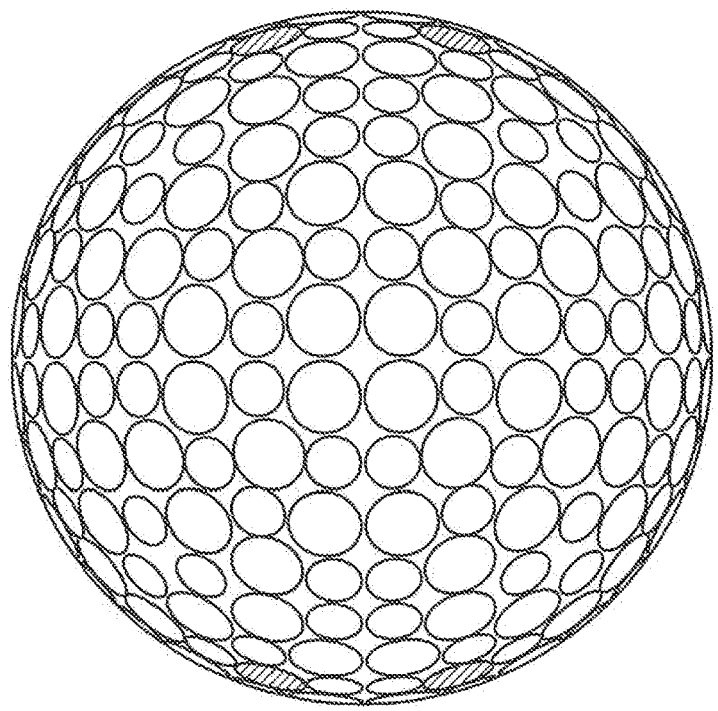
FIG. 12 is a front view of the golf ball in FIG. 11.
Figure 15:
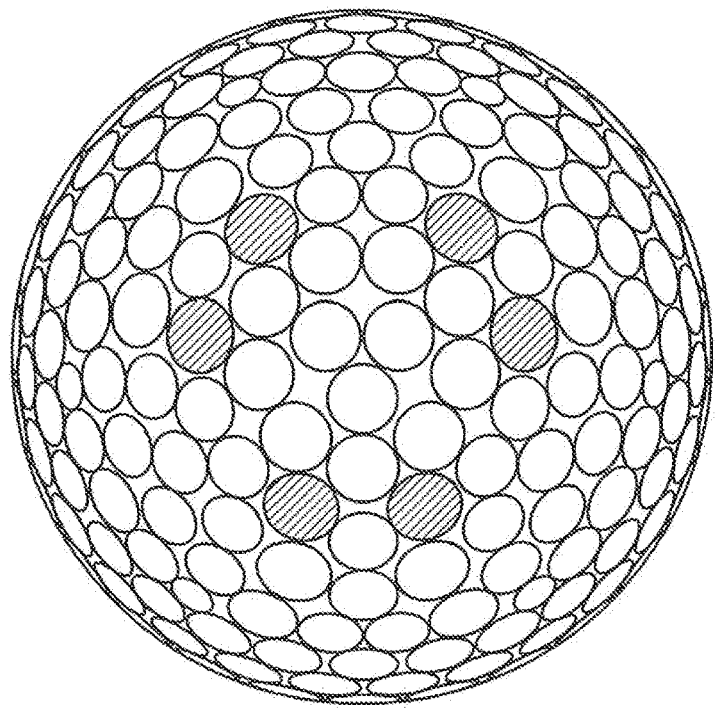
FIG. 15 is a plan view of a golf ball according to Comparative Example 7.
Figure 16:
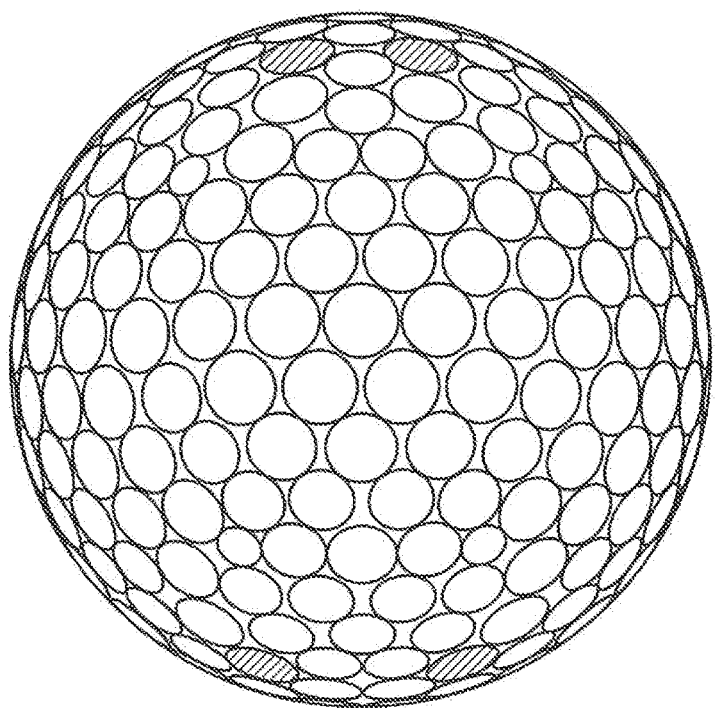
FIG. 16 is a front view of the golf ball in FIG. 15.

| | Example 5 | Example 6 | Comp. Example 7 | Example 7 | Example 8 |
|---|---|---|---|---|---|
| Core | | | | | |
| Composition | c | c | c | d | d |
| Dia. (mm) | 40.5 | 39.9 | 39.9 | 40.5 | 39.9 |
| S (mm) | 4.5 | 4.5 | 4.5 | 5.0 | 5.0 |
| Cover | | | | | |
| Composition | 1 | 1 | 1 | 1 | 1 |
| T (mm) | 1.10 | 1.40 | 1.40 | 1.10 | 1.40 |
| V (mm³) | 5451 | 6948 | 6937 | 5451 | 6948 |
| H (Shore D) | 57 | 57 | 57 | 57 | 57 |
| Dimple | | | | | |
| Pattern | II | III | V | II | III |
| Plan view | FIG. 11 | FIG. 2 | FIG. 15 | FIG. 11 | FIG. 2 |
| Front view | FIG. 12 | FIG. 3 | FIG. 16 | FIG. 12 | FIG. 3 |
| Spec. | (i) | (ii) | (v) | (i) | (ii) |
| W (mm³) | 531.1 | 557.3 | 568.1 | 531.1 | 557.3 |
| Support pin | | | | | |
| α (degree) | 67.5 | 70.0 | 62.0 | 67.5 | 70.0 |
| P (mm²) | 116.2 | 145.2 | 199.4 | 116.2 | 145.2 |
| Number | 8 | 10 | 12 | 8 | 10 |
| V/S | 1211 | 1544 | 1542 | 1090 | 1390 |
| α/P | 0.58 | 0.48 | 0.31 | 0.58 | 0.48 |
| Durability | 89 | 98 | 98 | 87 | 96 |
| Feel at impact | A | B | B | A | A |
| Eccentricity | C | B | A | C | B |
| Appearance | B | A | D | B | A |
| Flight distance | 99 | 100 | 100 | 99 | 100 |

As shown in Tables 4 to 6, the golf ball of each Example is excellent in various performance characteristics. From the evaluation results, advantages of the present invention are clear.

The golf ball according to the present invention is suitable for, for example, playing golf on golf courses and practicing at driving ranges. The above descriptions are merely illustrative examples, and various modifications can be made without departing from the principles of the present invention.

What is claimed is:

1. A method for producing a golf ball, the method comprising the steps of:
    placing a core into a mold having a plurality of support pins that is not greater than 12 and having a cavity face including a plurality of pimples;
    holding the core in a cavity of the mold by the support pins;
    injecting a melted resin composition into a space between the cavity face and the core; and
    solidifying the resin composition to form a cover and form a plurality of dimples having a shape that is an inverted shape of the pimples and having a diameter of not greater than 5.0 mm, wherein
    a ratio (V/S) of a volume V (mm$^3$) of the cover to an amount of compressive deformation S (mm) of the core is not less than 1000 and not greater than 1900,
    the cover has a shore D hardness of not less than 52 and not greater than 62,
    a total volume W of the dimples is not less than 490 mm$^3$ and not greater than 620 mm$^3$, and
    a ratio ($\alpha$/P) of a latitude a (degree) of each support pin to a total cross-sectional area P (mm$^2$) of the support pins is not less than 0.38 and not greater than 0.58.

2. The method for producing a golf ball according to claim 1, wherein the amount of compressive deformation S is not less than 3.5 mm.

3. The method for producing a golf ball according to claim 1, wherein the number of the support pins is not less than 8 and not greater than 12.

4. The method for producing a golf ball according to claim 1, wherein the number of the dimples is not less than 300 and not greater than 400.

5. The method for producing a golf ball according to claim 1, wherein the golf ball has a two-piece structure.

* * * * *